G. W. DENSON.
COTTON CHOPPER.
APPLICATION FILED FEB. 4, 1911.

994,725.

Patented June 13, 1911.

2 SHEETS—SHEET 1.

Witnesses
Edwin F. McKee
Wm. Bagger

Inventor
George W. Denson
By Victor J. Evans
Attorney

G. W. DENSON.
COTTON CHOPPER.
APPLICATION FILED FEB. 4, 1911.
994,725.
Patented June 13, 1911.
2 SHEETS—SHEET 2.
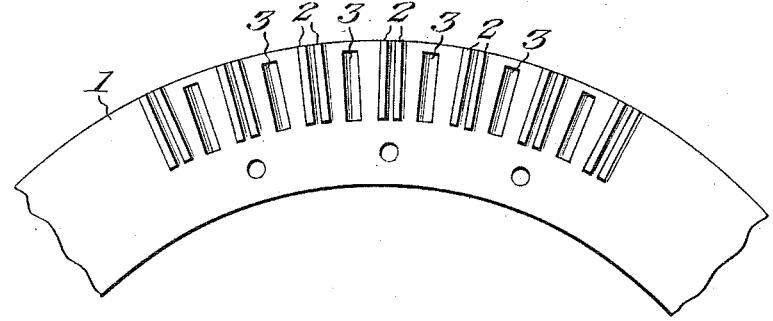
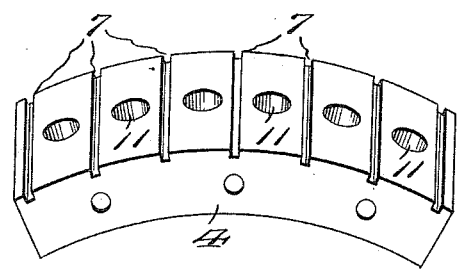
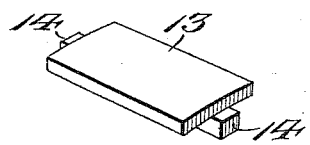
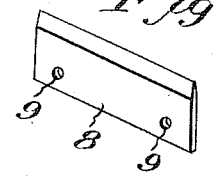
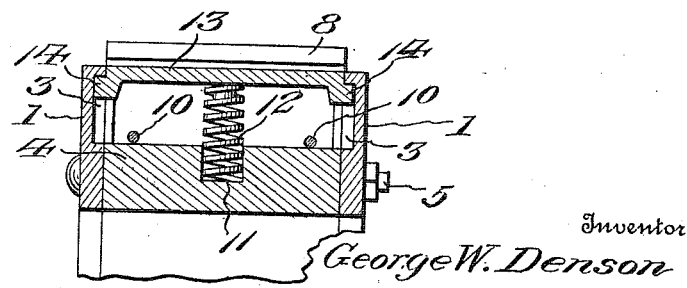
Witnesses
Edwin F. McKee
Wm. Bagger
Inventor
George W. Denson
By Victor J. Evans
Attorney

UNITED STATES PATENT OFFICE.

GEORGE W. DENSON, OF DAWSON, ALABAMA.

COTTON-CHOPPER.

994,725.     Specification of Letters Patent.    Patented June 13, 1911.

Application filed February 4, 1911. Serial No. 606,559.

*To all whom it may concern:*

Be it known that I, GEORGE W. DENSON, a citizen of the United States of America, residing at Dawson, in the county of De-kalb and State of Alabama, have invented new and useful Improvements in Cotton-Choppers, of which the following is a specification.

This invention relates to cotton choppers, and it has particular reference to that class of choppers which consist of a wheel supported for rotation and provided at the periphery thereof with knives or blades arranged to chop and destroy the plants which are to be exterminated, the portions of the periphery equipped with such knives or blades alternating with the blank sections where stands are to be left.

The present invention has for its object to simplify and improve the construction of the chopper wheel and to provide a construction whereby the parts may be conveniently assembled and put together at small expense.

A further object of the invention is to provide a simple and improved construction under which spring pressed followers are provided to discharge the dirt from between the chopping blades.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

Figure 1:
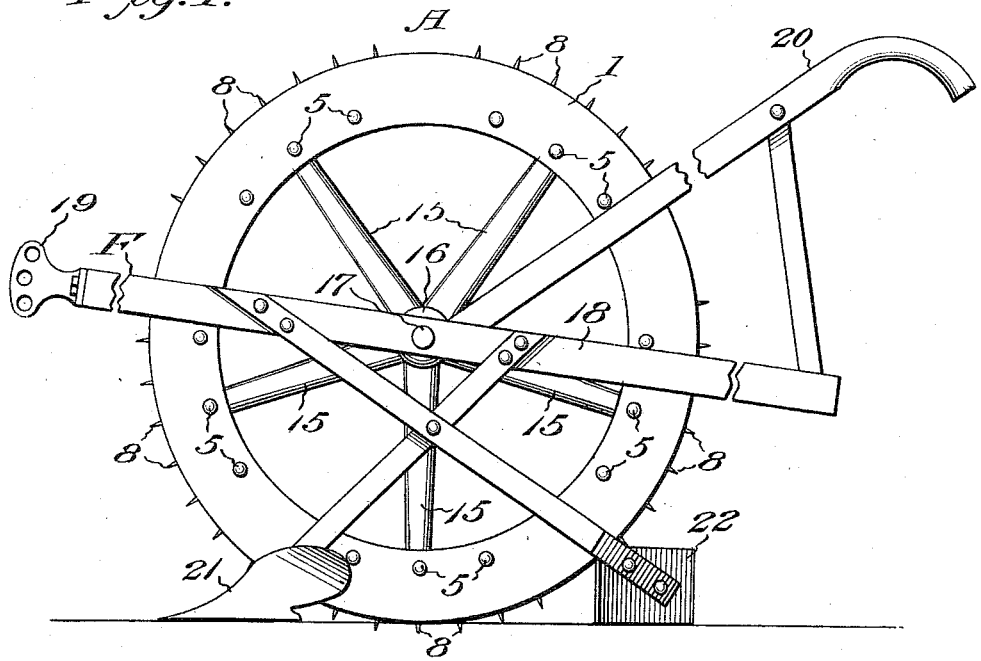
Figure 2:
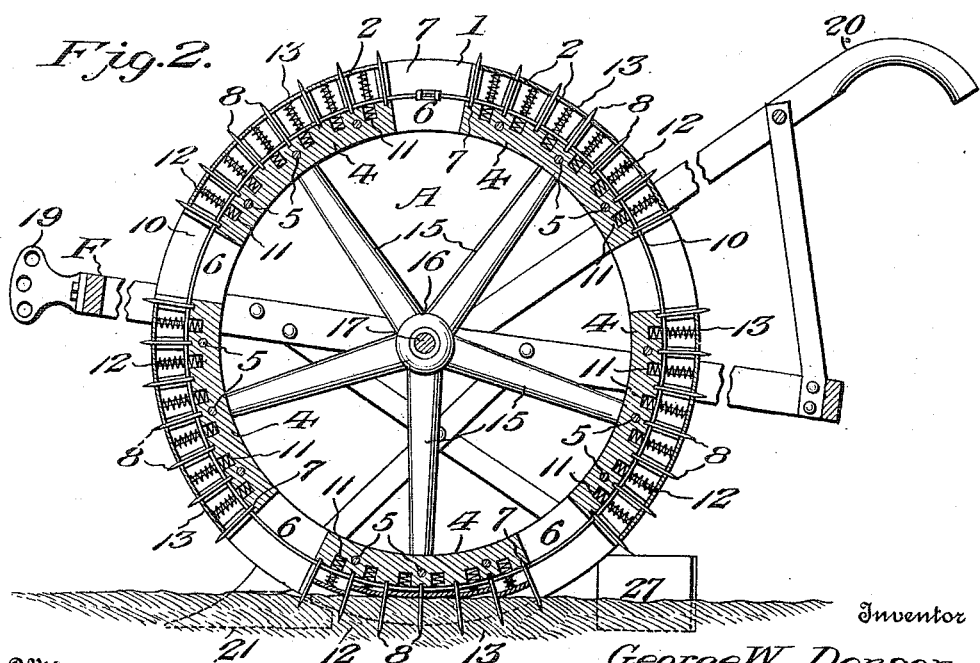

In the drawings,—Figure 1 is a side elevation of a cotton chopper constructed in accordance with the invention. Fig. 2 is a vertical longitudinal sectional view. Fig. 3 is a view showing one of the rings used in the construction of the chopping wheel detached. Fig. 4 is a perspective view of one of the fellies. Fig. 5 is a perspective detail view of one of the spring pressed followers. Fig. 6 is a perspective detail view of one of the chopping blades. Fig. 7 is a vertical transverse sectional view of the chopping wheel.

Corresponding parts in the several figures are denoted by like characters of reference.

The chopping wheel A of the improved device is composed of two flat annular members or rings 1, 1 which may be cast of malleable iron or other suitable material or otherwise constructed in any suitable manner. These wings are provided upon their inner faces with groups of radial flanges 2, 2 arranged in pairs and with radial slots 3 which are disposed intermediate the pairs of flanges. The rings 1, 1 are spaced apart by felly blocks 4 coinciding with the groups of slots and flanges, and connecting means such as bolts 5 serve to connect the rings with the fellies, the latter being spaced apart endwise, thereby leaving open spaces 6 between the rings 1, 1, such open spaces being of dimensions equal to the length of the stands that are to be left.

The felly blocks 4 are provided on the faces thereof with transverse grooves 7 coinciding with the grooves or spaces between the flanges 2, 2, said grooves being of sufficient width to accommodate the chopping blades 8. The latter are provided with apertures 9 for the reception of rings 10 of wire or other suitable material that extend around the periphery of the wheel for the purpose of retaining the blades in adjusted position.

The felly blocks are provided intermediate the grooves 9 with recesses or sockets 11 for the reception of coiled springs 12 which are provided for the purpose of forcing in an outward direction plates or followers 13 which are arranged intermediate the blades 8, said followers being provided at the ends thereof with lugs 14 that are fitted to slide in the slots 3 of the rings 1. It will be observed that these followers may be readily placed in position when the chopping wheel is assembled and that they will be retained in position between the rings 1, 1 when the latter are connected with the felly blocks.

The felly blocks 4 are connected by means of spokes 15 with a hub 16 which is supported for rotation upon an axle 17 mounted upon the side members 18 of a draft frame F which is provided at its front end with means such as a clevis 19 for the attachment of a draft animal and at its rear end with handles 20 whereby the machine may be manipulated. Suitably connected with the frame are scrapers 21 to bar off the cotton and sweeps 22 whereby the dirt is moved in the direction of the plants after the chopping operation.

The operation of this invention will be readily understood from the foregoing description taken in connection with the drawings. The chopping wheel is guided along the row of plants which will be chopped out by means of the blades 8, the dirt adhering between the blades being subsequently expelled by the followers 13, so that the dirt will be shaken loose from the roots of the plants, and the latter will be left exposed to the sun and thereby quickly wilted and destroyed. The open spaces 6 of the wheel are made of such dimensions that stands of suitable size will be left as the machine progresses. The cotton will be barred off by the scrapers 21, and the sweeps 22 will move the loose dirt toward the stands that are left, thereby protecting the plants and promoting the growth thereof.

The construction of the improved device is simple and inexpensive, and it has been found thoroughly efficient for the purposes for which it is provided.

Having thus described the invention, what is claimed as new, is:—

A chopping wheel comprising a pair of rings having groups of radial flanges arranged in pairs and slots alternating therewith, felly blocks coinciding with the groups of flanges and slots and spaced apart at the ends, said felly blocks being provided with grooves and recesses, chopping blades fitted between the flanges of the rings and in the grooves of the felly blocks coinciding therewith, said blades being provided with apertures, peripheral rings extending through the apertured blades and around the wheel, follower plates having lugs engaging the radial slots in the rings, and springs in the sockets of the felly blocks engaging the followers.

In testimony whereof I affix my signature in presence of two witnesses.

GEORGE W. X DENSON.
his mark

Witnesses:
P. C. HALE,
G. S. KILLIAN.

---

Copies of this patent may be obtained for five cents each, by addressing the "Commissioner of Patents, Washington, D. C."